(12) United States Patent
Luo et al.

(10) Patent No.: US 9,369,027 B2
(45) Date of Patent: Jun. 14, 2016

(54) MAGNETIC STEEL COOLING STRUCTURE FOR A PERMANENT MAGNETIC MOTOR OF AN ELECTRIC VEHICLE AND COOLING METHOD THEREOF

(76) Inventors: Jian Luo, Shanghai (CN); Lei Zhang, Shanghai (CN); Ziwei Chen, Shanghai (CN)

( * ) Notice: Subject to any disclaimer, the term of this patent is extended or adjusted under 35 U.S.C. 154(b) by 310 days.

(21) Appl. No.: 13/816,680

(22) PCT Filed: Jun. 27, 2011

(86) PCT No.: PCT/CN2011/076426
§ 371 (c)(1),
(2), (4) Date: Feb. 12, 2013

(87) PCT Pub. No.: WO2012/019493
PCT Pub. Date: Feb. 16, 2012

(65) Prior Publication Data
US 2013/0147290 A1    Jun. 13, 2013

(30) Foreign Application Priority Data
Aug. 13, 2010  (CN) .......................... 2010 1 0253082

(51) Int. Cl.
| | |
|---|---|
| *H02K 9/20* | (2006.01) |
| *H02K 5/20* | (2006.01) |
| *H02K 3/32* | (2006.01) |
| *H02K 9/19* | (2006.01) |

(52) U.S. Cl.
CPC .. *H02K 9/20* (2013.01); *H02K 3/32* (2013.01); *H02K 5/20* (2013.01); *H02K 9/19* (2013.01); *Y02T 10/641* (2013.01)

(58) Field of Classification Search
CPC ............ H02K 5/20; H02K 3/22; H02K 9/19; H02K 3/24
USPC .......................................... 310/52, 54, 58, 64
See application file for complete search history.

(56) References Cited

U.S. PATENT DOCUMENTS

| | | | | |
|---|---|---|---|---|
| 3,801,843 | A   * | 4/1974  | Corman et al. ................. | 310/52 |
| 7,443,062 | B2    | 10/2008 | Dong et al. | |
| 2006/0066156 | A1 * | 3/2006  | Dong et al. ..................... | 310/54 |
| 2007/0069593 | A1 * | 3/2007  | Vasilescu et al. ............... | 310/54 |
| 2009/0021005 | A1 * | 1/2009  | Kanao ...................... | 285/148.19 |
| 2012/0248918 | A1 * | 10/2012 | Itou et al. ................. | 310/156.48 |

FOREIGN PATENT DOCUMENTS

| | | |
|---|---|---|
| CN | 2664261 | 12/2004 |
| CN | 101752956 | 1/2010 |
| CN | 101951070 | 1/2011 |

* cited by examiner

*Primary Examiner* — Hanh Nguyen
(74) *Attorney, Agent, or Firm* — Avery N. Goldstein; Blue Filament Law

(57) ABSTRACT

A magnetic steel cooling structure for permanent magnetic motor of electric vehicle, which comprises a rotor core, magnet steels, and at least one heat pipe, the magnet steels are mounted in the rotor core, the heat pipe has an inner cavity inside which is contained a phase change material, the heat pipe is mounted in the rotor core and the outer wall of the heat pipe is contacted with the rotor core tightly, the inner cavity is inclined with respect to the axis of the rotor core A cooling method is also provided in which the magnetic steel cooling structure for the permanent magnetic motor of electric vehicle improves heat dissipation, stability and reliability of the motor, and finally improves the performance of the whole vehicle, moreover it has a simple structure, and is suitable for large-scale popularization.

8 Claims, 1 Drawing Sheet

MAGNETIC STEEL COOLING STRUCTURE FOR A PERMANENT MAGNETIC MOTOR OF AN ELECTRIC VEHICLE AND COOLING METHOD THEREOF

FIELD OF TECHNOLOGY

The present invention relates to the technical field of driving systems of electric vehicles, especially to the technical field of the driving motor of the driving system of an electric vehicle, and in particular to a magnetic steel cooling structure for a permanent magnetic motor of the electric vehicle and a cooling method thereof.

DESCRIPTION OF RELATED ARTS

As society pays more and more attention to environmental issues, substituting fuel vehicles with new types of energy driven vehicles has become a trend of the times, with pure electric vehicles experiencing an unprecedented development opportunity. Due to electric battery energy supply and storage constraints, electric vehicles are characterized as being of small sizes, and of light weight. The performance of the driving motor as the main power source for the electric vehicle has a direct effect on the performance of the whole vehicle. Therefore, the driving motor must have characteristics of a simple structure, small size, light weight, low loss, high efficiency and so on, and the permanent magnet motor has a good combination of these features. However, the small size of the permanent magnet motor will certainly have an affect on the heat dissipation of the motor, where high temperatures will bring about a risk of demagnetization of the magnetic steels. The loss of the magnetic performance of the permanent magnet caused by the demagnetization can be divided into two parts the reversible part and the irreversible part, where no matter what kind of part will result in reduction in motor efficiency and stability, and even cause the motor to stop. The performance and stability of the magnetic steels are an extremely important part of the permanent magnet motor, and have a direct effect on the performance of the motor and the whole vehicle. With the emergence of the third generation of rare earth permanent magnet material NdFeB, and its relatively high magnetic energy product and coercive force, rich raw material and cheap price have made it widely used. However, NdFeB also has some drawbacks: low Curie temperature and operating temperature, and the irreversible loss of its magnetic property at temperatures higher than 150° C. is more than 5%. Although metal elements such as dysprosium can be added to the permanent magnet alloy to reduce the effect of these drawbacks, the cost of the magnet will be higher.

Heat pipe technology is a heat transfer component invented by G. M. Grover of the U.S. Los Alamos National Laboratory in 1963. Heat pipes make full use of the heat conduction principle and the fast heat transfer properly of cooling mediums, to transfer heat of a heating object outside of the heat source quickly through the heat pipe. Heat pipe capacity of heat transmission exceeds that of any known metal. The heat pipe technology has previously been used widely in the aerospace, military and other industries, but never in the rotor of the permanent magnet motor.

Therefore, it is desirable to provide a magnetic steel cooling structure for permanent magnet motors of electric vehicles where the magnetic steel cooling structure is combined with the heat pipe technology, so as to improve heat dissipation of the driving motor, and finally improve the performance of the whole vehicle.

SUMMARY OF THE INVENTION

Aspects of the present invention generally pertain to a magnetic steel cooling structure for permanent magnetic motor of an electric vehicle and a cooling method thereof. The magnetic steel cooling structure for a permanent magnetic motor of an electric vehicle improves heat dissipation, stability and reliability of the motor, and finally improves the performance of the whole vehicle. Moreover, the magnetic steel cooling structure has a simple structure, and is suitable for large-scale popularization.

In order to realize the above aims, in a first aspect of the present invention, a magnetic steel cooling structure for a permanent magnetic motor of an electric vehicle is provided, and includes a rotor core and magnetic steels, with the magnet steels mounted in the rotor core. The magnetic steel cooling structure for a permanent magnetic motor of an electric vehicle further includes at least one heat pipe, the heat pipe having an inner cavity inside which is contained a phase change material. The heat pipe is mounted in the rotor core and the outer wall of the heat pipe is tightly contacted with the rotor core, and the inner cavity is inclined with respect to the axis of the rotor core.

In a further aspect, the heat pipe is arranged in parallel with the axis of the rotor core, and the inner cavity is inclined along the length direction of the heat pipe with respect to the outer wall of the heat pipe.

In a further aspect, the inner cavity is inclined along the length direction of the heat pipe about 1.5° with respect to the outer wall of the heat pipe.

In a further aspect, the number of the heat pipes is more than or equal to 2, and the inner cavities of the heat pipes are arranged in a splayed shape.

In a further aspect, the upper portion and the lower portion of the magnetic steels both are provided with the heat pipe.

In a further aspect, the rotor core is provided with at least one through slot in which the heat pipe is disposed, and the outer wall of the heat pipe is tightly contacted with the slot wall of the through slot.

In a second aspect of the present invention, a magnetic steel cooling method for a permanent magnetic motor of an electric vehicle is provided, and includes the following steps:

(1) the rotor core rotates at a high speed to generate a centrifugal force, under the role of the centrifugal force, the phase change material moves against the inner wall of the heat pipe near the axis along the direction far away from the axis and absorbs heat from the inner wall near the axis;

(2) the phase change occurs after the phase change material reaches its phase transition temperature, making the volume expand and the density become lower, so that the phase change material rises to be contacted with the inner wall of the heat pipe far away from the axis, and then the phase change material moves against the inner wall far away from the axis along the direction close to the axis and releases heat to the inner wall far away from the axis;

(3) the phase change occurs again when the phase change material reaches a temperature below its phase transition temperature, making the volume contract and the density become higher, so that the phase change material descends to be contacted with the inner wall of the heat pipe near the axis, and then the step (1) is carried out.

The advantages of the present invention are as follows: By mounting the heat pipes with an inner cavity having a certain inclination angle in the rotor core, and loading an appropriate phase change material in the heat pipes, while tightly contacting the outer walls of the heat pipes with the rotor core, the present invention releases heat from the inner walls of the heat pipes near the axis of the rotor core to the inner walls of the heat pipes far away from the axis of the rotor core by utilizing the centrifugal force generated by the rotation of the rotor core and the phase changes of the phase change material, so as to achieve the aim of conducting heat inside the rotor core and surrounding the magnetic steels out. Thus the occurrence of demagnetization at high temperatures can be avoided, and the present invention improves heat dissipation, stability and reliability of the motor. The inventive magnetic steel cooling structure improves the performance of the whole vehicle, and has a simple structure, which is suitable for large-scale popularization.

DETAILED DESCRIPTION OF THE PREFERRED EMBODIMENT

In order to clearly understand the technical content of the present invention, the present invention is further exemplified by reference to the following examples. It is only intended to make the contents of the present invention to be better understood, and not to limit the protection scope of the present invention.

Figure 1:
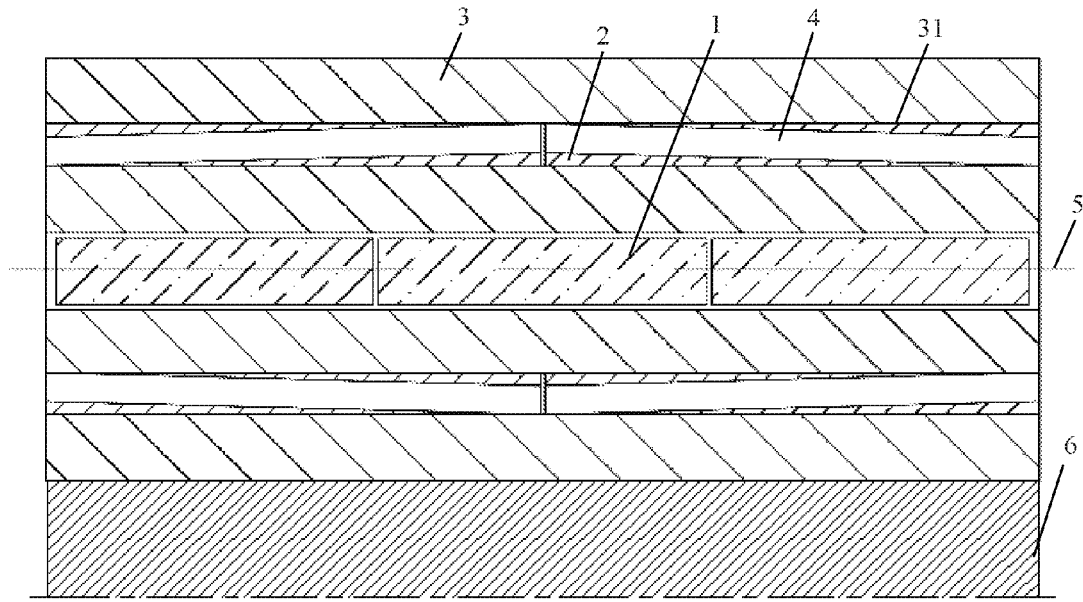
FIG. 1 is a schematic partial sectional view of one embodiment of the magnetic steel cooling structure for a permanent magnetic motor of an electric vehicle according to an embodiment of the present invention.
Figure 2:
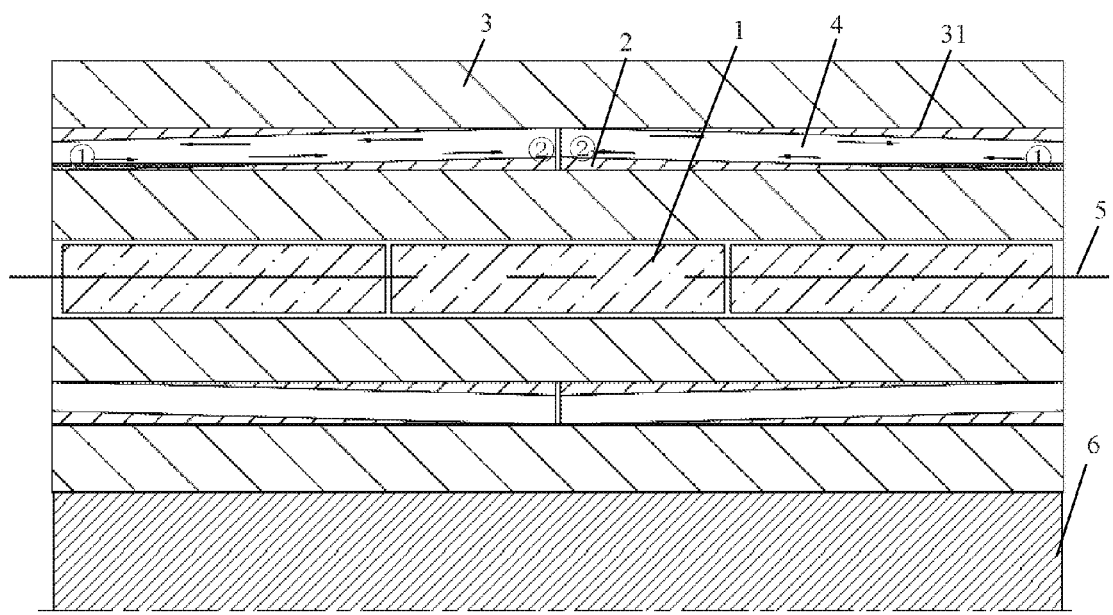
FIG. 2 is a schematic view of the working principle of the embodiment shown in FIG. 1.

Please refer to FIGS. 1-2, the magnetic steel cooling structure for a permanent magnetic motor of an electric vehicle of the present invention includes magnetic steels 1, at least one heat pipe 2 and a rotor core 3, where the magnet steels 1 are mounted in the rotor core 3 surrounding a shaft 6. The heat pipe 2 has an inner cavity (not shown) inside which is contained a phase change material 4. The heat pipe 2 is mounted in the rotor core 3 and the outer wall of the heat pipe 2 is tightly contacted with the rotor core 3 to achieve a good thermal conductivity, where the inner cavity of the heat pipe 2 is inclined with respect to the axis 5 of the rotor core 3.

The heat pipe 2 may have any suitable shape, as long as it is mounted in the rotor core 3. The inner cavity is inclined with respect to the axis 5 of the rotor core 3. For example, the heat pipe 2 can be a heat pipe with a uniform pipe wall, and when it is mounted, it is inclined with respect to the axis 5 of the rotor core 3. Preferably, the heat pipe 2 is arranged in parallel with the axis 5 of the rotor core 3, and the inner cavity is inclined along the length direction of the heat pipe 2 with respect to the outer wall of the heat pipe 2. That is to say, the heat pipe 2 is a heat pipe having an inclined inner cavity. Please refer to FIGS. 1-2, in an embodiment of the present invention, the inner cavity is inclined along the length direction of the heat pipe 2 about 1.5° with respect to the outer wall of the heat pipe 2. Therefore one portion of the pipe wall of the heat pipe 2 becomes gradually thicker along its length direction, while the opposite portion of the pipe wall becomes gradually thinner along its length direction.

The number of the heat pipes 2 can be determined according to the rotor's requirement. Preferably, the number of the heat pipes 2 is more than or equal to 2, and the inner cavities of heat pipes 2 are arranged in a splayed shape. Please refer to FIGS. 1-2, in an embodiment of the present invention, the number of the heat pipes 2 is more than 2, and the inner cavities of heat pipes 2 are arranged in a splayed shape. That is to say, the inner cavities of the heat pipes 2 present an open type inclination from outside to inside in the rotor core 3.

In order to achieve a better cooling effect, please refer to FIGS. 1-2, where in an embodiment of the present invention, the upper portion and the lower portion of the magnetic steels both are provided with the heat pipe 2.

Please refer to FIGS. 1-2, in an embodiment of the present invention, the rotor core 3 is provided with at least one through slot 31 in which the heat pipe 2 is disposed, and the outer wall of the heat pipe 2 is tightly contacted with the slot wall of the through slot 31.

The phase change material 4 may be any suitable phase change material, In an embodiment of the present invention, the phase change material 4 adopts the phase change material described in the Chinese Patent Application CN200510078244.2, which is composed of water, alcohol, glycerol and saline with the proportion described in the embodiment 2 of this patent application. The operating temperature of the heat pipe 2 is 100-300° C., and is completely within the motor's operating temperature range, thus the heat pipe 2 can have an effect on the thermal operation of the motor.

Please refer to FIG. 2, when the above-mentioned magnetic steel cooling structure for a permanent magnetic motor of an electric vehicle is used to cool the magnetic steels, the rotor core 3 rotates at a high speed on the shaft 6 to generate a centrifugal force, and under the role of the centrifugal force, the phase change material 4 moves against the inner wall of the heat pipe 2 near the axis 5 along the direction far away from the axis 5 (i.e., moves from the position ① to the position ② along the direction shown by the lower arrows in FIG. 2) and absorbs heat from the inner wall near the axis 5; the phase change occurs after the phase change material 4 reaches its phase transition temperature, from liquid into gas, making the volume expand and the density become lower, so that the phase change material 4 rises to be contacted with the inner wall of the heat pipe 2 far away from the axis 5, and then the phase change material 4 moves against the inner wall far away from the axis 5 along the direction close to the axis 5 (i.e., moves from the position ② to the position ① along the direction shown by the upper arrows in FIG. 2) and releases heat to the inner wall far away from the axis 5; the phase change occurs again when the phase change material 4 reaches a temperature below its phase transition temperature, from gas into liquid, making the volume contract and the density become higher, no that the phase change material 4 descends to be contacted with the inner wall of the heat pipe 2 near the axis 5, and then the above mentioned process is repeated, so as to form a circulation, to achieve the aim of conducting heat inside the rotor core 3 and surrounding the magnetic steels 1 out, thus the occurrence of demagnetization at high temperatures can be avoided.

Therefore, the present invention adopts the inclined heat pipes filled with a suitable phase change material 4, and mounts the heat pipes in the through slots 31 that have been cut in the rotor core 3. Therefore by utilizing the centrifugal force generated by the high speed rotation of the driving rotor, the phase change material 4 moves from the position ① to the position ②, and is contacted with the inner wall of the heat pipe 2 near the axis 5 of the rotor core 3, and then absorbs heat to change the phase. Due to the density difference and the volume expansion, the phase change material 4 then moves from the position ② to the position ①, and is contacted with the inner wall of the heat pipe 2 far away from the axis 5 of the rotor core 3, then releases heat to change the phase again, such a process moves in circles, so as to achieve the aim of heat dissipation by conducting heat surrounding the magnetic steels 1 out of the rotor core 3.

To sum up, the magnetic steel cooling structure for a permanent magnetic motor of an electric vehicle of the present invention improves heat dissipation, stability and reliability of the motor, and finally improves the performance of the whole vehicle. Moreover, the magnetic steel cooling structure has a simple structure, and is suitable for large-scale popularization In the present specification, the present invention has been described according to the particular embodiments. But it is obvious that these embodiments can be modified or changed without departure from the spirit and scope of the present invention. Therefore, the specification and drawings described above are exemplary only and not intended to be limiting.

We claim:

1. A magnetic steel cooling structure for a permanent magnetic motor for an electric vehicle, the magnetic steel cooling structure comprising:
    a rotor core in the shape of a cylinder with a walled section with a hollow center, where the walled section has an outer surface distal to the hollow center and an inner surface proximal to and defining the hollow center;
    a set of pellets formed of magnetic steels, where the set of pellets of magnetic steels are mounted inside the hollow center of the rotor core along a concentric axis of the rotor core;
    a plurality of heat pipes, where each of the plurality of heat pipes have an inner cavity inside which is contained a phase change material, the plurality of heat pipes being mounted in the walled section of the rotor core and each of the plurality of heat pipes having an outer wall in tight contact with the rotor core, where the inner cavity is inclined with respect to the concentric axis of the rotor core; and
    wherein the inner cavities of the plurality of heat pipes are arranged in a splayed shape along a length direction of the rotor core, and a top portion of the splayed shape aligns with a middle of the rotor core.

2. The magnetic steel cooling structure according to claim 1, characterized in that, the plurality of heat pipes are arranged in parallel with the concentric axis of the rotor core, and the inner cavity is inclined along the length direction of the heat pipe with respect to the outer wall of the heat pipe.

3. The magnetic steel cooling structure according to claim 2, characterized in that, the inner cavity is inclined along the length direction of the heat pipe about 1.5° with respect to the outer wall of the heat pipe.

4. The magnetic steel cooling structure according to claim 1, characterized in that, an upper portion and a lower portion of the pellets of magnetic steels both are provided with the heat pipe.

5. The magnetic steel cooling structure according to claim 1, characterized in that, the walled section of the rotor core is provided with at least one through slot in which the heat pipe is disposed, and the outer wall of the heat pipe is in tight contact with a slot wall of the through slot.

6. The magnetic steel cooling structure according to claim 5, characterized in that, the at least one through slot in which the heat pipe is disposed is parallel to the concentric axis.

7. A magnetic steel cooling method for a permanent magnetic motor of an electric vehicle, characterized in that, the method adopts the magnetic steel cooling structure according to claim 1, and the method comprises the following steps:
    (1) the rotor core rotates at a high speed to generate a centrifugal force, under the influence of the centrifugal force, the phase change material moves against an inner wall of the heat pipe near the concentric axis along the direction far away from the concentric axis and absorbs heat from the inner wall near the concentric axis;
    (2) the phase change occurs after the phase change material reaches its phase transition temperature, making the volume expand and the density become smaller, so that the phase change material rises to be contacted with the inner wall of the heat pipe far away from the concentric axis, and then the phase change material moves against the inner wall far away from the concentric axis along the direction close to the concentric axis and releases heat to the inner wall far away from the concentric axis; and
    (3) the phase change occurs again when the phase change material reaches a temperature below its phase transition temperature, making the volume contract and the density become bigger, so that the phase change material descends to be contacted with the inner wall of the heat pipe near the concentric axis, and then the step (1) is carried out.

8. The magnetic steel cooling structure according to claim 1, characterized in that, the rotor is mounted on a shaft.

* * * * *